United States Patent [19]
Oda

[11] Patent Number: 5,776,416
[45] Date of Patent: Jul. 7, 1998

[54] CYCLONE AND FLUIDIZED BED REACTOR HAVING SAME

[75] Inventor: Hiroyuki Oda, Tokuyama, Japan

[73] Assignee: Tokuyama Corporation, Yamaguchi-Ken, Japan

[21] Appl. No.: 748,611

[22] Filed: Nov. 13, 1996

[30] Foreign Application Priority Data

Nov. 14, 1995 [JP] Japan ................... 7-295835

[51] Int. Cl.$^6$ ............................... F27B 15/18
[52] U.S. Cl. .................... 422/145; 55/430; 55/431; 55/459.1; 55/466; 122/4 D; 422/139; 422/144; 422/146; 422/147
[58] Field of Search ................. 422/139, 144, 422/145, 146, 147; 122/4 D; 55/459.1, 466, 430, 431

[56] References Cited

U.S. PATENT DOCUMENTS

| | | | |
|---|---|---|---|
| 4,687,497 | 8/1987 | Owen et al. | 55/349 |
| 4,946,656 | 8/1990 | Ross et al. | 422/144 |
| 5,271,905 | 12/1993 | Owen et al. | 422/142 |
| 5,552,120 | 9/1996 | Sechrist et al. | 422/144 |
| 5,612,003 | 3/1997 | Huemann | 422/139 |

*Primary Examiner*—Timothy McMahon
*Attorney, Agent, or Firm*—Beveridge, DeGrandi, Weilacher & Young, LLP

[57] ABSTRACT

A fluidized bed reactor comprises a reaction column, gas inflow means for flowing a gas upwardly from the lower end of the reaction column, particle feed means for feeding particles to a lower part of the reaction column, and a cyclone. The cyclone includes a cyclone body having an inlet, a gas outlet and a particle drop port, and a particle discharge pipe having an upper end communicating with the particle drop port of the cyclone body. A main fluidized bed of particles fed by the particle feed means is formed at the lower part of the reaction column, and a gas, which is to be discharged from the reaction column and which is accompanied by particles, is introduced from the inlet into the cyclone body and discharged from the gas outlet of the cyclone body. The particle discharge pipe of the cyclone communicates with the lower part of the reaction column. The cyclone further includes sealing means for feeding a sealing gas to the particle discharge pipe to generate a gas stream ascending through the particle discharge pipe, and to produce a sealing fluidized bed of particles separated from the gas in the cyclone.

11 Claims, 1 Drawing Sheet

CYCLONE AND FLUIDIZED BED REACTOR HAVING SAME

FIELD OF THE INVENTION

This invention relates to a cyclone which is preferably used in a fluidized bed reactor, although not restricted to, for producing trichlorosilane gas by the reaction of silicon (metallurgical grade) particles, hydrogen gas and silicon tetrachloride gas, and a fluidized bed reactor equipped with such a cyclone.

DESCRIPTION OF THE PRIOR ART

As is well known, the production of a silicon semiconductor wafer involves generating trichlorosilane gas by the reaction of silicon particles with hydrogen gas and silicon tetrachloride gas, and forming polycrystalline silicon from this trichlorosilane gas. The generation of trichlorosilane gas uses a fluidized bed reactor equipped with a reaction column, as disclosed, for example, in "Fluidized Bed Reactor—Realities of Industrialization and New Technologies—" (edited by Japan Chemical Industry Association) published by Kabushiki Kaisha Kagaku Kogyosha. A dispersing plate is disposed at the lower end of the reaction column. Hydrogen gas and silicon tetrachloride gas are flowed into the reaction column upwardly of the dispersing plate. Silicon particles are supplied to a lower part of the reaction column through a feed pipe protruding into the reaction column. In this manner, a fluidized bed of the silicon particles is formed at the lower part of the reaction column. The fluidized bed reactor is further equipped with a cyclone. This cyclone includes a cyclone body having an inlet, a gas outlet, and a particle drop port, and a particle discharge pipe whose upper end communicates with the particle drop port of the cyclone body. Usually, a dust hopper is interposed between the cyclone body and the particle discharge pipe. The cyclone body, the dust hopper, and the particle discharge pipe are placed in the reaction column such that the cyclone body is located at an upper part of the reaction column, namely, above the fluidized bed formed at the lower part of the reaction column, and a lower part of the particle discharge pipe is located in the fluidized bed. At the forward end or lower end of the particle discharge pipe, a so-called weight-actuated valve such as a trickle valve or a flap valve is disposed which is opened when a load of more than a predetermined value acts on it.

In a typical state of operation of the above-described fluidized bed reactor, the average particle diameter of the silicon particles fed to the lower part of the reaction column is 100 to 200 µm. Thus, the average particle diameter of the silicon particles forming the fluidized bed formed at the lower part of the reaction column immediately after starting operation is 100 to 200 µm. Small-diameter particles with relatively small diameters of, say, 60 µm or less among the silicon particles in the fluidized bed are raised to the upper part of the reaction column as a gas stream ascends through the fluidized bed. Then, these small particles are introduced along with gas (the gas is trichlorosilane and hydrogen) into the cyclone body of the cyclone through its inlet. Within the cyclone body, small particles excluding fine particles with markedly small diameters of, say, 5 µm or less are separated from the gas, and dropped through the particle drop port of the cyclone body into the particle discharge pipe via the dust hopper. The gas accompanied by the fine particles is discharged from the cyclone body through the gas outlet. Such fine particles accompanying the gas are separated from the gas by filter means. The small-diameter particles separated from the gas in the cyclone body and falling into the particle discharge pipe are accumulated inside the particle discharge pipe. The outer surface of an on-off valve member in the weight-actuated valve disposed at the lower end of the particle discharge pipe undergoes pressure occurring in the fluidized bed formed at the lower part of the reaction column (pressure ascribed to the gas and pressure attributed to the silicon particles forming the fluidized bed). The inner surface of the on-off valve member in the weight-actuated valve is subject to pressure ascribed to the gas in the cyclone, and pressure attributed to the weight of the small-diameter particles accumulated in the particle discharge pipe. Thus, when the amount of the small-diameter particles accumulated in the particle discharge pipe exceeds a certain amount, the pressure acting on the inner surface of the on-off valve member of the weight-actuated valve surpasses the pressure acting on its outer surface. Consequently, the on-off valve member is opened to return the small-diameter particles from the lower end of the particle discharge pipe to the fluidized bed formed at the lower part of the reaction column. After some small-diameter particles are returned to the fluidized bed, the pressure acting on the inner surface of the on-off valve member of the weight-actuated valve is decreased, and the on-off valve member is closed again. If the weight-actuated valve is not disposed at the lower end of the particle discharge pipe, the unacceptable event will arise that the gas flowed into the reaction column is flowed through the particle discharge pipe, dust hopper and cyclone body of the cyclone in this order, and discharged to the outside.

The conventional fluidized bed reactor described above poses the following problem to be solved: When small-diameter particle recirculation for returning the small-diameter particles to the fluidized bed formed at the lower part of the reaction column is performed by the action of the cyclone, the average particle diameter of the silicon particles forming the fluidized bed is gradually decreased accordingly. With the decrease in the average particle diameter of the silicon particles forming the fluidized bed, the bulk specific gravity of the fluidized bed decreases. Hence, the bulk of the fluidized bed formed in the reaction column is increased, with the result that the top surface of the fluidized bed is gradually raised. The rise in the top surface of the fluidized bed increases that length of the particle discharge pipe of the cyclone which has sunk into the fluidized bed, thereby increasing that amount of the small-diameter particles accumulated in the particle discharge pipe which is necessary to open the on-off valve member in the weight-actuated valve. Under these circumstances, if the fluidized bed reactor is continuously operated for a relatively long period of time, the amount of the small-diameter particles accumulated in the particle discharge pipe of the cyclone excessively increases. Even if the top surface of the accumulated small-diameter particles reaches the interior of the cyclone body, the on-off valve member in the weight-actuated valve does not open or close. In this case, the action of the cyclone is damaged, so that the silicon particles greater than 5 µm, i.e., from about 5 to 60 µm, are also discharged together with the gas from the gas outlet of the cyclone body, and so wasted. To solve this problem, it can be attempted to dispose, instead of the weight-actuated valve, an on-off control valve which can be controlled openably and closably according to the amount of the small-diameter particles accumulated in the particle discharge pipe of the cyclone. However, the temperature of the reaction column is 400° C. or more, normally about 500° C.

Constituting an on-off control valve, which can be controlled openably and closably, where necessary, in such a high temperature atmosphere, is very difficult, although not impossible.

SUMMARY OF THE INVENTION

An object of the present invention is to provide a novel and improved cyclone which enables the above-described type of fluidized bed reactor and other devices to be operated as required, without the necessity for disposing the weight-actuated valve at the lower end of the particle discharge pipe of the cyclone, accordingly, while avoiding the aforementioned problem related to the weight-actuated valve.

Another object of the present invention is to provide a novel and improved fluidized bed reactor which acts as required, although the weight-actuated valve is not disposed at the lower end of the particle discharge pipe of a cyclone provided in the fluidized bed reactor, and accordingly, the aforementioned problem related to the weight-actuated valve is avoided.

I have conducted extensive studies and experiments. As a result, I have found, to my surprise, that the above-described problem can be solved, and the objects attained, by feeding a sealing gas to the particle discharge pipe of the cyclone to generate a gas stream ascending through the particle discharge pipe, and to produce a sealing fluidized bed of particles separated from the gas in the cyclone.

As a cyclone which attains the one object, the present invention provides a cyclone including a cyclone body having an inlet for introducing a gas accompanied by particles, a gas outlet, and a particle drop port, and a particle discharge pipe having an upper end communicating with the particle drop port of the cyclone body;

the cyclone further including sealing means for feeding a sealing gas to the particle discharge pipe to generate a gas stream ascending through the particle discharge pipe, and to produce a sealing fluidized bed of particles separated from the gas in the cyclone.

As a fluidized bed reactor for attaining the other object, the present invention also provides a fluidized bed reactor which comprises a reaction column, gas inflow means for flowing a gas upwardly from the lower end of the reaction column, particle feed means for feeding particles to a lower part of the reaction column, and a cyclone; and in which the cyclone includes a cyclone body having an inlet, a gas outlet and a particle drop port, and a particle discharge pipe having an upper end communicating with the particle drop port of the cyclone body;

a main fluidized bed of particles fed by the particle feed means is formed at the lower part of the reaction column; and a gas which is to be discharged from the reaction column and which is accompanied by particles is introduced from the inlet into the cyclone body and discharged from the gas outlet of the cyclone body; and the particle discharge pipe of the cyclone communicates with the lower part of the reaction column; wherein the cyclone further includes sealing means for feeding a sealing gas to the particle discharge pipe to generate a gas stream ascending through the particle discharge pipe, and to produce a sealing fluidized bed of particles separated from the gas in the cyclone.

Preferably, the cyclone includes a dust hopper interposed between the cyclone body and the particle discharge pipe, and the sealing fluidized bed is formed in the dust hopper. To produce the sealing fluidized bed stably, it is recommendable to establish the relationship $Ut<Ud$ where $Ut$ is the terminal velocity of gas with respect to the substantially maximum particle diameter of particles (i.e. the maximum particle diameter of particles excluding excessively large particles accidentally existing) forming the sealing fluidized bed, and $Ud$ is the linear velocity of ascerding gas at the sealing gas supply position in the particle discharge pipe, and to establish the relationship $Uu<Ut$ where $Uu$ is the linear velocity of gas at the top surface of the sealing fluidized bed. Particularly advantageously, the linear velocity $Uu$ stands in the relationship $Umf<Uu<Ut$ where $Umf$ is the minimum fluidization linear velocity of gas with respect to the average particle diameter of particles forming the sealing fluidized bed. In a preferred embodiment of the fluidized bed reactor of the present invention, the cyclone is placed in the reaction column, the particles are silicon particles, and the gas to be flowed into the reaction column from its lower end includes hydrogen gas and silicon tetrachloride gas. The temperature of the reaction column is 400° C. or more, the sealing means includes a heat exchange flow path located inside an upper part of the reaction column, and the sealing gas is fed through the heat exchange flow path. Preferably, the sealing means either alternately performs constant gas supply for producing the sealing fluidized bed stably, and undersupply of gas or gas supply stop for decreasing or stopping the supply of the sealing gas; or alternately performs constant gas supply for producing the sealing fluidized bed stably, and oversupply of gas for increasing the supply of the sealing gas.

In the fluidized bed reactor of the present invention, the gas flowed into the reaction column is prevented, by the sealing effect of the sealing fluidized bed formed in the cyclone, from ascending through the particle discharge pipe into the cyclone body. Thus, there is no need to dispose a weight-actuated valve at the lower end of the particle discharge pipe. At the lower part of the particle discharge pipe, there are accumulated small-diameter particles in an amount which is defined by pressure difference between the pressure inside the particle discharge pipe and the pressure of the main fluidized bed formed at the lower part of the reaction column. Small-diameter particles separated from the gas in the cyclone body are dropped on the top surface of the sealing fluidized bed. When the amount of the small-diameter particles forming the sealing fluidized bed becomes too large, surplus small-diameter particles are dropped through the particle discharge pipe, and returned to the main fluidized bed inside the reaction column. In the fluidized bed reactor of the present invention, too, when small-diameter particle recirculation for returning small-diameter particles to the main fluidized bed formed at the lower part of the reaction column is performed by the action of the cyclone, the average particle diameter of the silicon particles forming the main fluidized bed is gradually decreased accordingly. With the decrease in the average particle diameter of the silicon particles forming the main fluidized bed, the bulk specific gravity of the main fluidized bed decreases. Hence, the top surface of the main fluidized bed formed in the reaction column is gradually raised, and the amount of small-diameter particles accumulated in the particle discharge pipe is also gradually increased. When the bulk specific gravity of the main fluidized bed becomes too small, either the supply of the sealing gas is decreased or stopped, or the supply of the sealing gas is increased, for a required period of time. Under this situation, the sealing fluidized bed is decreased or eliminated, whereupon the gas flowed into the reaction column ascends through the particle discharge pipe, enters the cyclone body, and goes out through the gas outlet of the cyclone body. Accompanying this gas, relatively small silicon particles with particle sizes of, say, 5 to 60 μm also discharge. In addition, the particle separating action inside the cyclone body is somewhat impaired owing to a gas stream flowing into the cyclone body through the particle discharge pipe. Thus, silicon particles with particle sizes of about 5 to 60 μm (small diameter particles) accompany a gas introduced through the inlet into the cyclone body and discharged from the gas outlet, and thereby drain off. Consequently, the average particle diameter of the silicon particles forming the main fluidized bed formed in the reaction column is gradually increased, whereby the bulk specific gravity of the main fluidized bed is gradually increased. When the bulk specific gravity of the main fluidized bed is restored to a required value, the supply of the sealing gas can be returned to the normal state. During the increasing of the bulk specific gravity of the main fluidized bed in the above-described manner, silicon particles with particle sizes of 5 to 60 μm are wasted. However, the amount of the silicon particles wasted in this manner is relatively small.

DETAILED DESCRIPTION OF THE PREFERRED EMBODIMENTS

Figure 1:
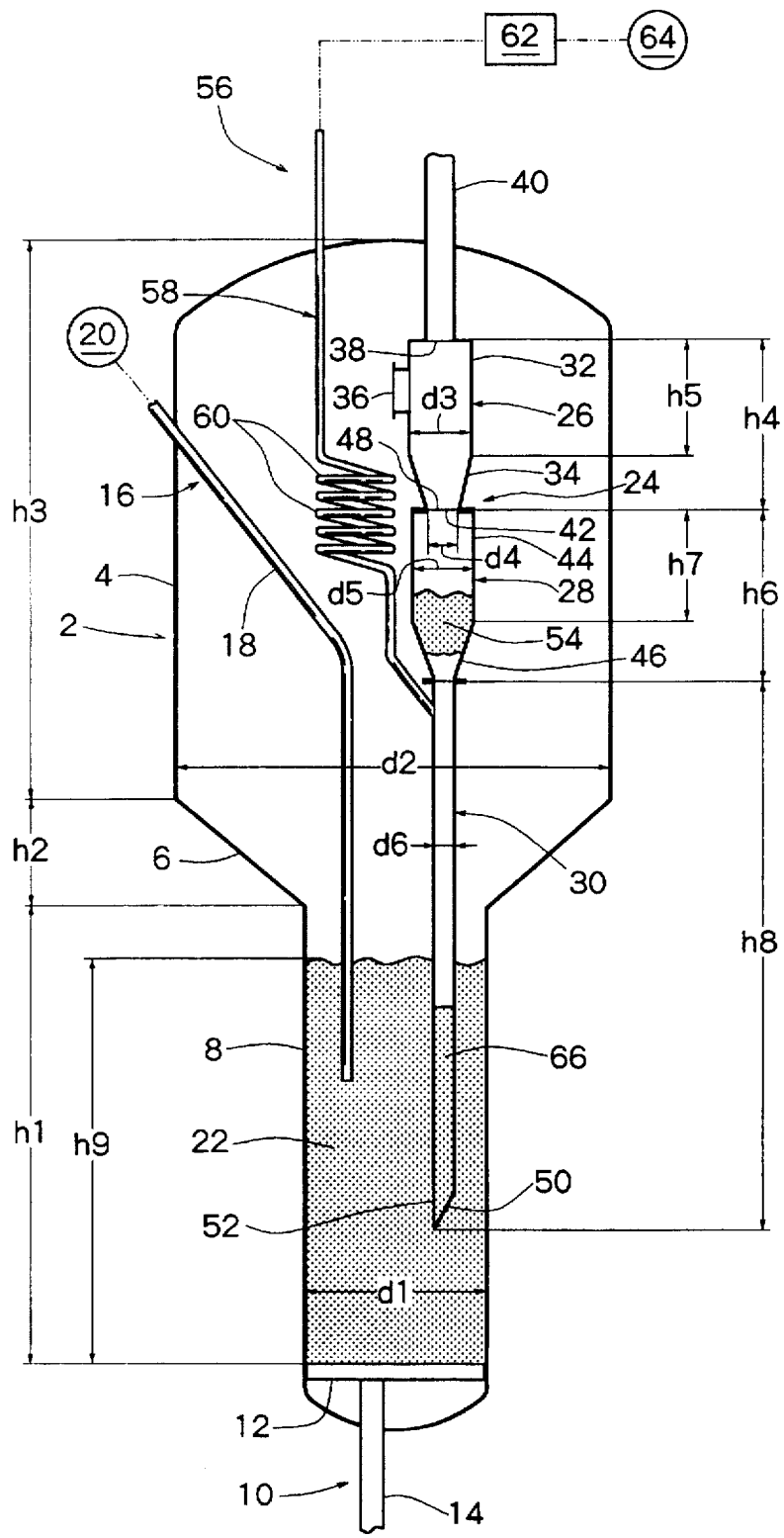
FIG. 1 is a schematic sectional view showing a preferred embodiment of a fluidized bed reactor constructed in accordance with the present invention.

A preferred embodiment of a fluidized bed reactor constructed in accordance with the present invention will now be described in detail with reference to the accompanying drawing.

Referring to FIG. 1, a sectional view schematically illustrating a fluidized bed reactor constructed according to the present invention, the illustrated fluidized bed reactor has a reaction column generally designated by the numeral 1. The reaction column 2 may be formed of a suitable metal such as stainless steel. According to my experience, when the reaction column 2 is formed of stainless steel, a long-term reaction for producing trichlorosilane tends to form a compound of iron and silicon (Fe—Si) as scale on the inner surface of the reaction column 2. To avoid the formation of such a compound, the reaction column 2 may be made of a high nickel alloy such as Inconel 600. The illustrated reaction column 2 extends substantially vertically, and has a free board portion 4 of a relatively large-diameter cylindrical shape, a taper portion 6 of an inverted truncated conical tubular shape, and a fluid portion 8 of a relatively small-diameter cylindrical shape. The inside diameter of the upper end of the taper portion 6 agrees with the internal diameter of the free board portion 4, while the inside diameter of the lower end of the taper portion 6 agrees with the internal diameter of the fluid portion 8.

A lower end part of the reaction column 2 is provided with gas inflow means 10. The gas inflow means 10 includes a dispersing plate 12 disposed at the lower end part of the reaction column 2, and a gas inflow pipe 14 joined to the dispersing plate 12. Hydrogen gas and silicon tetrachloride gas are fed to the dispersing plate 12 through the gas inflow pipe 14, and such gases are flowed upwardly inside the reaction column 2. The reaction column 2 is also provided with particle feed means 16. The particle feed means 16 includes a particle feed pipe 18 which advances into the reaction column 2 through the peripheral wall of the free board portion 4 of the reaction column 2 and extends downwardly into the fluid portion 8 of the reaction column 2. The particle feed pipe 18 is connected to a particle feed source 20 which supplies silicon particles at a predetermined pressure to the particle feed pipe 18. Silicon particles are fed into a lower part of the reaction column 2, i.e., the fluid portion 8, through the particle feed pipe 18 at a predetermined pressure. Thus, a fluidized bed of the silicon particles, i.e., a main fluidized bed 22, is formed in the fluid portion 8 of the reaction column 2. Preferably, the silicon particles to be fed into the reaction column 2 through the particle feed pipe 18 have an average particle diameter of about 100 to 200 μm. The dispersing plate 12 and the gas inflow pipe 14 that constitute the gas inflow means 10, and the particle feed pipe 18 constituting the particle feed means 16 may also be formed of a suitable metal such as stainless steel or high nickel alloy.

The reaction column 2 is further equipped with a cyclone generally designated by the numeral 24. In the illustrated embodiment, the cyclone 24 is entirely disposed within the reaction column 2. The cyclone 24 includes a cyclone body 26, a dust hopper 28, and a particle discharge pipe 30. The cyclone body 26, dust hopper 28, and particle discharge pipe 30 may be formed of a suitable metal such as stainless steel or high nickel alloy. The cyclone body 24 has a nearly cylindrical upper part 32, and a lower part 34 of an inverted truncated conical tubular shape having an internal diameter gradually decreased downwardly. An inlet 36 is formed in the peripheral wall of the upper part 32, and a gas outlet 38 is formed in the top surface of the upper part 32. The cyclone body 26 is positioned in the upper part of the reaction column 2, i.e., the free board portion 4, and its inlet 36 is opened in the free board portion 4 of the reaction column 2. An outlet pipe 40 is connected to the gas outlet 38 of the cyclone body 26, and this outlet pipe 40 extends through the top wall of the reaction column 2. The bottom surface of the cyclone body 26, namely, the bottom surface of the lower part 34, is opened throughout to form a particle drop port 42. The dust hopper 28 has a cylindrical upper part 44, and a lower part 46 of an inverted truncated conical tubular shape. The upper end of the upper part 44 is coupled to the lower end of the cyclone body 26, and an opening 48 directly connected to the particle drop port 42 of the cyclone body 26 is formed at the top of the upper part 44. The internal diameter of the upper part 44 of the dust hopper 28 is somewhat larger than the internal diameter of the particle drop port 42 formed at the lower end of the cyclone body 26. The bottom surface of the dust hopper 28, namely, the bottom surface of the lower part 46, is opened throughout. The particle discharge pipe 30 is formed of a slenderly extending cylindrical member, and its upper end is joined to the lower end of the dust hopper 28. Thus, the upper end of the particle discharge pipe 30 is made to communicate with the particle drop port 42 of the cyclone body 26 via the dust hopper 28. The internal diameter of the particle discharge pipe 30 may be substantially the same as the internal diameter of the lower end of the dust hopper 28. A lower half of the particle discharge pipe 30 is immersed in the main fluidized bed 22 formed in the lower part of the reaction column 2. At a lower end part of the particle discharge pipe 30, a right half of this lower end part in FIG. 1 is formed into an incline wall 50 extending downwardly leftwardly in an inclined manner, while its left half is opened in FIG. 1 to form a particle outlet 52.

In the cyclone 24 in the fluidized bed reactor constructed in accordance with the present invention, there is disposed no valve for opening and closing the particle outlet 52 formed at the lower end part of the particle discharge pipe 30. It is important that sealing means 56 be disposed for supplying a gas to the particle discharge pipe 30 to form a sealing fluidized bed 54 in the cyclone 24. The sealing means 56 in the illustrated embodiment includes a hollow pipe member 58 which may be formed of a suitable metal such as stainless steel or steel-nickel alloy. A downstream end part of the hollow pipe member 58 is connected to an upper part of the particle discharge pipe 30 after extending in the reaction column 2 downwardly rightwardly in an inclined manner in FIG. 1. An upstream end part of the hollow pipe member 58 extends through the top wall of the reaction column 2. The hollow pipe member 58 includes a coiled portion 60 positioned in the reaction column 2. This coiled portion 60 defines a heat exchange flow path for realizing heat exchange between a gas flowed through the pipe member 58 and the gas present in the reaction column 2. The upstream end of the hollow pipe member 58 is connected to a compressed gas supply source 64 via flow rate adjusting means 62 which may be of a well known type. In this sealing means 56, gas supplied from the compressed gas supply source 64 is fed into the upper part of the particle discharge pipe 30 through the hollow pipe member 58. The flow rate of the gas fed is adjusted, where necessary, by the flow rate adjusting means 62. While the gas fed by the compressed gas supply source 64 is flowing through the coiled portion 60 of the hollow pipe member 58, this gas is heated by hot gas present in the reaction column 2. The atmosphere in the reaction column 2 is at 400° C. or more, and normally about 500° C. The gas to be fed into the particle discharge pipe 30 is heated to a temperature close to the temperature of the atmosphere in the reaction column 2, whereby the gas fed to the particle discharge pipe 30 is fully reliably prevented from condensing in the particle discharge pipe 30. A sealing gas supplied from the compressed gas supply source 64 may be hydrogen gas, argon gas, nitrogen gas, trichlorosilane gas, or a mixture of any of these.

The actions of the above-described fluidized bed reactor will be summarized. When hydrogen gas ($H_2$) and silicon tetrachloride gas ($3SiCl_4$) flowed into the reaction column 2 through the dispersing plate 12 ascend inside the reaction column 2 past the main fluidized bed 22 of silicon (Si) particles, trichlorosilane gas is produced by the reaction $3SiCl_4 + Si + H_2 \rightarrow 4SiHCl_3$. While the gas is ascending through the main fluidized bed 22 in the reaction column 2, relatively small-diameter particles of the silicon particles constituting the main fluidized bed 22 accompany the ascending gas stream, and flow upwardly from the main fluidized bed 22. However, the linear velocity of the gas gradually decreases while the gas is going up through the taper portion 6 with an upwardly gradually increasing sectional area. Thus, the particles other than considerably small particles are separated from the ascending gas stream, and dropped to the main fluidized bed 22. According to my experience, the average particle diameter of the silicon particles fed to the main fluidized bed 22 is nearly 150 μm. When a desired main fluidized bed 22 is formed of such silicon particles at the lower part of the reaction column 2, i.e., the fluid portion 8, the particles carried upwards to the free board portion 4 of the reaction column 2 along with the gas stream are usually those with particle sizes of nearly 60 μm or less.

In the free board portion 4 of the reaction column 2, the gas accompanied by small-diameter silicon particles with particles sizes of, say, 60 μm or less is introduced into the cyclone body 26 through the inlet 36. In the cyclone body 26, the small-diameter particles accompanying the gas are separated from the gas while the introduced gas is flowing in a whirl, as this is well known. Thus, the gas accompanied only by fine particles with particle sizes of 5 μm or less is discharged through the outlet pipe 40 through the gas outlet 38. The gas discharged through the outlet pipe 40 is delivered to a precipitation device (not shown) for precipitation of polycrystalline silicon, after the accompanying fine particles are removed by the action of suitable filter means (not shown).

The small-diameter particles separated from the gas in the cyclone body 26 are dropped to the dust hopper 28 through the particle drop port 42. In the dust hopper 28, the sealing gas fed to the upper part of the particle discharge pipe 30 ascends through the particle discharge pipe 30 to flow into the dust hopper 28. The sealing gas further ascends through the dust hopper 28, thereby producing the sealing fluidized bed 54 of small-diameter particles dropped from the cyclone body 26. The particle outlet 52 formed at the lower end of the particle discharge pipe 30 is open to the main fluidized bed 22 formed in the reaction column 2, and the pressure of the main fluidized bed 22 acts on the lower part of the particle discharge pipe 30. Thus, the gas fed to the upper part of the particle discharge pipe 30 is not flowed downwardly through the particle discharge pipe 30. To stably produce the desired sealing fluidized bed 54 in the region ranging from the cylindrical upper part 44 to the inverted truncated conical lower part 46 of the dust hopper 28, it is preferred that the linear velocity Ud of ascending gas at the sealing gas supply position in the particle discharge pipe 30 satisfies the relationship Ut<Ud, and the linear velocity Uu of ascending gas at the top surface of the sealing fluidized bed 54 satisfies the relationship Uu<Ut, especially, Umf<Uu<Ut. In these relationships, Ut is the terminal velocity of gas (i.e., the linear velocity at which the gas flies particles) related to the substantial maximum particle diameter (e.g. about 60 μ of the particles that have been separated from the gas in the cyclone body 26, and dropped to the dust hopper 28 to form the sealing fluidized bed 54; whereas Umf is the minimum fluidization linear velocity of gas related to the average particle diameter of the particles that have been separated from the gas in the cyclone body 26, and dropped to the dust hopper 28 to form the sealing fluidized bed 54. Since the sealing fluidized bed 54 is produced in the dust hopper 28, the gas introduced into the reaction column 2 is prevented from flowing in large amounts through the particle discharge pipe 30, dust hopper 28, and cyclone body 26 in this order. When the particles separated in the cyclone body 26 gradually fall to the dust hopper 28 to make the amount of particles forming the sealing fluidized bed 54 too large, surplus particles are dropped downwardly of the sealing fluidized bed 54, and accumulated in the lower part of the particle discharge pipe 30 as shown by the numeral 66 in FIG. 1. When the amount of the particles accumulated in the lower part of the particle discharge pipe 30 becomes too large, surplus particles are returned to the main fluidized bed 22 through the particle outlet 52. Owing to the pressure of the sealing gas fed to the upper part of the particle discharge pipe 30, the top surface of the accumulated particles 66 in the lower part of the particle discharge pipe 30 is normally somewhat lower than the top surface of the main fluidized bed 22 formed in the lower part of the reaction column 2.

When the operation of the fluidized bed reactor is continued in the foregoing manner, small-diameter particles with an average particle diameter of, say, about 30 μm are returned through the cyclone 24 to the main fluidized bed 22 formed in the reaction column 2. Partly because of this, the average particle diameter of the silicon particles forming the main fluidized bed 22 is gradually decreased, and the bulk specific gravity of the main fluidized bed 22 is gradually reduced. As the bulk specific gravity of the main fluidized bed 22 is decreased, the top surface of the main fluidized bed 22 and the top surface of the accumulated particles 66 formed in the lower part of the particle discharge pipe 30 of the cyclone 24 are raised. When the average particle diameter of the silicon particles forming the main fluidized bed 22 has decreased excessively, the supply of the sealing gas to the upper part of the particle discharge pipe 30 is decreased or stopped to bring the aforementioned linear velocity Ud into the relationship Ud<Ut. By this measure, the sealing fluidized bed 54 formed in the dust hopper 28 is decreased or eliminated. The gas flowed into the reaction column 2 ascends through the particle discharge pipe 30, flows through the dust hopper 28 and cyclone body 26, and discharges through the gas outlet 38 of the cyclone body 26. Accompanying this gas, relatively small silicon particles with particle sizes of, say, 5 to 60 μm also go out. Owing to a gas stream flowing into the cyclone body 26 through the particle discharge pipe 30 and the dust hopper 28, the particle separating action in the cyclone body 26 is somewhat inhibited. Because of this, the gas introduced into the cyclone body 26 through the inlet 36 and discharged through the gas outlet 38 is also accompanied by silicon particles with particle diameters of about 5 to 60 μm, which are thereby drained. Thus, the average particle diameter of the silicon particles forming the main fluidized bed 22 is gradually increased, thus resulting in the gradual increase in the bulk specific gravity of the main fluidized bed 22. When the bulk specific gravity of the main fluidized bed 22 is restored to a required value, the supply of the sealing gas can be returned to normal.

Instead of decreasing or stopping the supply of the sealing gas to the upper part of the particle discharge pipe 30 to bring the linear velocity Ud into the relationship Ud<Ut, it is permissible to increase the supply of the sealing gas to the upper part of the particle discharge pipe 30 to bring the linear velocity Uu into the relationship Ut<Uu. In the case of Ut<Uu, the sealing fluidized bed 54 formed in the dust hopper 28 is decreased or eliminated. Because of this, as when the linear velocity Ud is Ud<Ut, silicon particles with particle diameters of about 5 to 60 μm are drained together with the gas. Thus, the average particle diameter of the silicon particles forming the main fluidized bed 22 is gradually increased.

If desired, the flow rate adjusting means 62 of the sealing means 56 may be equipped with, for example, control means having a timer, thereby making it possible to automatically alternately perform constant supply of the sealing gas for producing the required sealing fluidized bed 54 in the dust hopper 28; and gas undersupply or gas supply stop for decreasing or stopping the supply of the sealing gas, or gas oversupply for increasing the supply of the sealing gas. In this case, the control means can be set, for instance, such that after constant gas supply is performed for 4 consecutive days (96 hours), 8 hours of gas undersupply or gas supply stop or gas oversupply is carried out.

In the illustrated embodiment, the upper end of the dust hopper 28 is directly connected to the particle drop port 42 of the cyclone body 26 in the cyclone 24. If desired, however, a suitable tubular member, such as a cylindrical member having substantially the same internal diameter as the particle discharge pipe 30, may be disposed between the cyclone body 26 and the dust hopper 28. If desired, moreover, the dust hopper 28 disposed between the cyclone body 26 and the particle discharge pipe 30 may be omitted. In this case, the sealing fluidized bed may be formed at that lower part of the cyclone body whose sectional area is gradually decreased downwardly. If this is done, it is desired that the vertical length of the lower part of the cyclone body be relatively large so that the sealing fluidized bed can be produced without impairing the function of the cyclone body. In the illustrated embodiment, the whole of the cyclone 24 is placed in the reaction column 2, but if desired, the whole or part of the cyclone may be disposed outside of the reaction column 2. In this case, too, it is important that the inlet of the cyclone body be made to communicate with the upper part of the reaction column 2, and the particle outlet 52 of the particle discharge pipe 30 be made to communicate with the main fluidized bed 22 formed in the reaction column 2.

EXAMPLE

An experimental fluidized bed reactor of a shape as illustrated in FIG. 1 was produced. The dimensions of this fluidized bed reactor were as follows (see FIG. 1):

Height h1 from top surface of dispersing plate to lower end of the taper portion in reaction column: 650 mm Height h2 of taper portion of reaction column: 150 mm Height h3 of free board portion of reaction column: 1100 mm Internal diameter d1 of fluid portion of reaction column: 298 mm Internal diameter d2 of free board portion of reaction column: 478 mm Height h4 of cyclone body: 380 mm Height h5 of upper part of cyclone body: 150 mm Height h6 of dust hopper: 300 mm Height h7 of upper part of dust hopper: 200 mm Height h8 of particle discharge pipe: 700 mm Internal diameter d3 of upper part of cyclone body: 115 mm Internal diameter d4 of lower end of cyclone body: 40 mm Internal diameter d5 of upper part of dust hopper: 100 mm Internal diameter d6 of particle discharge pipe: 30 mm In the above-described fluidized bed reactor, silicon particles with an average particle diameter of 150 μm were fed to the lower part of the reaction column. Simultaneously, hydrogen gas and silicon tetrachloride gas were fed in a total amount of 100 m³/hour into the reaction column through the dispersing plate. The main fluidized bed having the height h9 of about 600 mm was thereby formed on the dispersing plate. Furthermore, hydrogen gas was supplied as sealing gas to the upper part of the particle discharge pipe of the cyclone. Substantially all of the scattering silicon particles accompanying the gas discharged through the gas outlet of the cyclone body were collected. When the amount of the sealing gas fed was varied, the relationship in Table 1 was noted between the amount of the sealing gas fed, and the amount and average particle diameter of the scattering silicon particles accompanying the discharged gas. When the amount of the sealing gas fed was 5 m³/hour, the average particle diameter of the silicon particles forming the sealing fluidized bed produced stably in the dust hopper, accordingly, the average particle diameter of the silicon particles separated from the gas in the cyclone body during constant operation, was about 30 μm, and the substantially maximum particle diameter of the silicon particles was about 60 μm. Measurements were made of the terminal velocity Ut and the minimum fluidization linear velocity Umf of gas for the silicon particles. The terminal velocity Ut was 14 cm/second, and the minimum fluidization linear velocity Umf was 1 to 2 cm/second.

TABLE 1

| Sealing gas | | Scattering silicon particles | |
|---|---|---|---|
| Amount fed (m³/hr) | Linear velocity Uu(cm/sec) | Amount (kg/hr) | Ave.particle diameter (µm) |
| 0 | 0 | 0.46 | 10 |
| 0.8 | 3 | 0.01 or less | 2 |
| 1.3 | 4.5 | 0.01 or less | 4 |
| 2.0 | 7 | 0.01 or less | 4 |
| 2.5 | 9 | 0.01 or less | 5 |
| 3.4 | 12 | 0.01 or less | 5 |
| 5.1 | 18 | 2.14 | 18 |

Table 1 gives the following findings: The amount of the sealing gas fed is suitably set, and the linear velocity Uu of ascending gas on the top surface of the sealing fluidized bed in the particle discharge pipe is set at Ut (14 cm/sec) or less to form the sealing fluidized bed stably in the dust hopper. Under these conditions, the cyclone is appropriately sealed, and the gas let into the reaction column is reliably prevented from flowing in large amounts through the particle discharge pipe, the dust hopper and the cyclone body in this order. Only fine particles with very small particle diameters accompany the gas discharged through the gas outlet of the cyclone body. When the supply of the sealing gas is stopped, there is an increase in the average particle diameter of the particles accompanying the gas discharged through the gas outlet of the cyclone body. When the sealing gas is oversupplied to make its linear velocity Uu larger than Ut, there is a further increase in the average particle diameter of the particles accompanying the gas discharged through the gas outlet of the cyclone body.

What I claim is:

1. A cyclone comprising:
   a cyclone body having an inlet for introducing a gas accompanied by particles, a gas outlet, and a particle drop port,
   a particle discharge pipe having an upper end in communication with said particle drop port of said cyclone body,
   a sealing means for feeding a sealing gas to said particle discharge pipe to generate a sealing gas stream ascending through said particle discharge pipe, whereby the sealing gas stream produces a sealing fluidized bed that includes particles separated from the gas that entered through said inlet by said cyclone body, the sealing fluidized bed includes a top surface, and
   a flow rate adjusting means for controlling a linear velocity Ud of the sealing gas stream in said particle discharge pipe at said sealing means and indirectly controlling a linear velocity Uu of the sealing gas stream at the top surface of the sealing fluidized bed.

2. The cyclone as defined in claim 1, wherein said cyclone includes a dust hopper interposed between said cyclone body and said particle discharge pipe,
   whereby said sealing fluidized bed is formed in said dust hopper.

3. A fluidized bed reactor which comprises:
   a reaction column having a fluid portion,
   a gas inflow means for flowing a gas upwardly from said fluid portion of said reaction column,
   a particle feed means for feeding particles to said fluid portion of said reaction column,
   a cyclone in communication with said fluid portion and said reaction column, said cyclone including:
   a cyclone body having an inlet, a gas outlet, and a particle drop port,
   a particle discharge pipe having an upper end in communication with said particle drop port of said cyclone body,
   a sealing means for feeding a sealing gas to said particle discharge pipe to generate a sealing gas stream ascending through said particle discharge pipe, whereby the sealing gas stream produces a sealing fluidized bed that includes particles separated from the gas that entered through said inlet by said cyclone, the sealing fluidized bed includes a top surface, and
   a flow rate adjusting means for controlling a linear velocity Ud of the sealing gas stream in said particle discharge pipe at said sealing means and indirectly controlling a linear velocity Uu of the sealing gas stream at the top surface of the sealing fluidized bed;
   said particle discharge pipe of said cyclone communicates with said fluid portion of said reaction column; and
   wherein the main fluidized bed of particles fed by said particle feed means is formed in said fluid portion of said reaction column, and
   the gas discharged from said reaction column and accompanied by particles when introduced through said inlet into said cyclone body is discharged from said gas outlet of said cyclone body.

4. The fluidized bed reactor as defined in claim 3, wherein said cyclone includes a dust hopper interposed between said cyclone body and said particle discharge pipe,
   whereby said sealing fluidized bed is formed in said dust hopper.

5. The fluidized bed reactor as defined in claim 3, wherein said cyclone is placed in said reaction column.

6. The fluidized bed reactor as defined in claim 3, wherein said sealing means includes a heat exchange flow path located inside an upper part of said reaction column, and
   said sealing gas is fed through said heat exchange flow path.

7. The fluidized bed reactor as defined in claim 3 further comprising a flow rate adjusting means for said sealing means for alternately adjusting the supply of sealing gas to provide either a constant sealing gas supply to said sealing fluidized bed sufficient to maintain said fluidized bed in position below said particle drop port, or to provide an oversupply or undersupply of the sealing gas.

8. The cyclone as defined in claim 1, wherein
   there exists a minimum fluidization linear velocity Umf of gas related to the average particle diameter of the particles separated from the gas accompanied by particles, and
   the linear velocity Uu of the sealing gas is such that a relationship Umf<Uu<Ut is satisfied.

9. The cyclone as defined in claim 1, wherein there exists a terminal velocity Ut of gas related to a substantial maximum particle diameter of the particles separated from the gas that entered through said inlet of said cyclone body such that the linear velocity Ud of the sealing gas stream in said discharge pipe at said sealing means is greater than the terminal velocity Ut of gas (Ut<Ud) and the linear velocity Uu of the sealing gas stream at the top surface is less than the terminal velocity Ut of gas (Uu<Ut).

10. The fluidized bed reactor as defined in claim 3, wherein there exists a minimum fluidization linear velocity Umf of gas related to the average particle diameter of the particles separated from the gas accompanied by particles, and the linear velocity Uu of the sealing gas is such that a relationship Umf<Uu<Ut is satisfied.

11. The fluidized bed reactor as defined in claim 3, wherein there exists a terminal velocity Ut of gas related to a substantial maximum particle diameter of the particles separated from the gas that entered through said inlet of said cyclone body such that the linear velocity Ud of the sealing gas stream in said discharge pipe at said sealing means is greater than the terminal velocity Ut of gas (Ut<Ud) and the linear velocity Uu of the sealing gas stream at the top surface is less than the terminal velocity Ut of gas (Uu<Ut).

* * * * *